US005613813A

United States Patent [19]

Winchester et al.

[11] Patent Number: 5,613,813

[45] Date of Patent: Mar. 25, 1997

[54] ROUTER ADJUSTMENT RING

[75] Inventors: Charles D. Winchester, Easley; Ronald C. McCurry, West Union, both of S.C.

[73] Assignee: Ryobi North America, Inc., Easley, S.C.

[21] Appl. No.: 614,181

[22] Filed: Mar. 12, 1996

Related U.S. Application Data

[60] Provisional application No. 60/002,206, Aug. 11, 1995.

[51] Int. Cl.$^{6}$ .......... B23C 1/20

[52] U.S. Cl. .......... 409/182; 144/136.95; 144/154.5; 409/214

[58] Field of Search .......... 409/181, 182, 409/206, 210, 214; 144/136.95, 154.5

[56] References Cited

U.S. PATENT DOCUMENTS

| | | | |
|---|---|---|---|
| 2,867,251 | 1/1959 | Moretti et al. . | |
| 2,988,119 | 6/1961 | Godfrey et al. . | |
| 3,443,479 | 5/1969 | Hawley et al. . | |
| 4,051,880 | 10/1977 | Hestily | 409/182 |
| 4,108,225 | 8/1978 | Hestily . | |
| 4,445,811 | 5/1984 | Sanders . | |
| 5,074,724 | 12/1991 | McCracken | 409/182 |
| 5,094,575 | 3/1992 | Kieser et al. . | |
| 5,176,479 | 1/1993 | McCracken | 409/182 |

*Primary Examiner*—Daniel W. Howell
*Attorney, Agent, or Firm*—Brooks & Kushman P.C.

[57] ABSTRACT

The height adjustment ring assembly is provided for adjusting height of a router motor housing relative to a router body, the router being movable between upright and inverted positions. The housing includes external threads formed thereon. The height adjustment ring assembly comprises a support member secured to the router base, the support having a radially extending flange portion. An annular adjustment ring includes an internal thread for cooperation with the external threads. Means for entrapping the flange portion with respect to the adjustment ring is provided, thereby limiting relative axial movement while allowing free relative rotation of the adjustment ring with respect to the support member for adjustment of the router motor housing regardless of router position. First and second zero reset rings are rotatably secured to the adjustment ring for relative rotation with respect to the adjustment ring, each reset ring having indicia formed thereon to facilitate accurate adjustment of the motor housing with respect to the router base in both the upright and inverted positions.

16 Claims, 5 Drawing Sheets

ROUTER ADJUSTMENT RING

CROSS REFERENCE TO RELATED APPLICATION

This is a utility application claiming the benefit of provisional application Ser. No. 60/002,206 filed Aug. 11, 1995.

The present invention relates to routers, and more particularly to an apparatus for fine adjustment of cutting depth of a router bit.

BACKGROUND OF THE INVENTION

Routers typically comprise a baseplate of generally annular form from which pillars extend. On the pillars is mounted a structure movable towards and away from the baseplate. The structure includes a driving motor, usually an electric motor, on whose output shaft is mounted a collet for receiving a tool bit of a configuration appropriate to the task to be performed. On moving the structure towards the baseplate, the tool bit moves through the central aperture in the baseplate and into engagement with the workpiece.

The tool is fitted with a depth gauge that is set by a user and determines the extent of the downward movement of the structure. The extent of the downward movement of the structure determines the extent of movement of the bit, which must be done accurately for accurate cutting.

Typically, adjustment rings are provided which cooperate with a threaded section on the peripheral portion of the router motor assembly for motor assembly height adjustment. Prior art height adjustment rings when used on the router in an upright position work quite well. The height adjustment ring is used to raise motor assembly relative to the base and the force of gravity causes the motor assembly to be lowered relative to the base when a height adjustment ring is raised. A problem occurs with conventional height adjustment ring routers when the router is used in an inverted position on a router table. In the inverted position, gravity causes the motor assembly to move away from the base so an operator must exert an axial lifting force on the motor assembly in order to maintain the height adjustment ring in engagement with the base.

Additionally, typical prior art routers include only a single upper zero reset ring for fine adjustment of the router bit. With this configuration, when the router is in the inverted position on a router table or the like, the conventional upper zero reset ring is frequently obstructed from view. This can be a significant problem when attempting to make accurate cuts.

DISCLOSURE OF THE INVENTION

The present invention overcomes the above-referenced shortcomings of prior art router assemblies by providing a height adjustment ring assembly for a router which allows easy and accurate adjustment of the router bit equally well in both upright and inverted positions. The present invention further provides both upper and lower zero reset rings, thereby allowing the operator to accurately adjust the router bit equally regardless of router position.

More specifically, the present invention provides a height adjustment ring assembly for adjusting height of a router motor housing relative to a router body, the router being movable between upright and inverted positions. The motor housing includes external threads formed thereon. The height adjustment ring assembly includes a support member secured to the router body, the support member having a radially extending flange portion. An annular adjustment ring includes an internal thread for cooperation with the external threads. The adjustment ring assembly also includes means for entrapping the flange portion with respect to the adjustment ring, thereby limiting relative axial movement while allowing free relative rotation of the adjustment ring with respect to the support member for adjustment of the router motor housing regardless of router position.

A further aspect of the present invention provides a router height adjustment assembly as described above, wherein the means for entrapping the flange portion comprises an annular retainer secured to the adjustment ring, and having an inwardly extending rim. The flange portion of the support member is entrapped between the rim and the adjustment ring, thus limiting relative axial movement while allowing free relative rotation for adjustment of the router motor housing relative to the router body regardless of router position.

Another aspect of the present invention provides a height adjustment ring assembly as described above, further comprising first and second zero reset rings rotatably secured to the adjustment ring for relative rotation with respect to the adjustment ring, each zero reset ring having indicia formed thereon. First and second reference markers are secured with respect to the router body adjacent the first and second zero reset rings, respectively, thus facilitating accurate adjustment of the motor housing with respect to the router body in both the upright and inverted positions.

Accordingly, an object of the present invention is to provide a router height adjustment ring assembly which allows easy and accurate adjustment of the router bit regardless of router position.

A further object of the present invention is to provide a router height adjustment ring assembly which includes both upper and lower zero reset rings in order to allow convenient and accurate adjustment of the router bit in both upright and inverted router orientations.

The above objects and other objects, features and advantages of the present inventions are readily apparent from the following detailed description when taken in connection with the accompany drawings.

DETAILED DESCRIPTION OF THE PREFERRED EMBODIMENT

Figure 1:
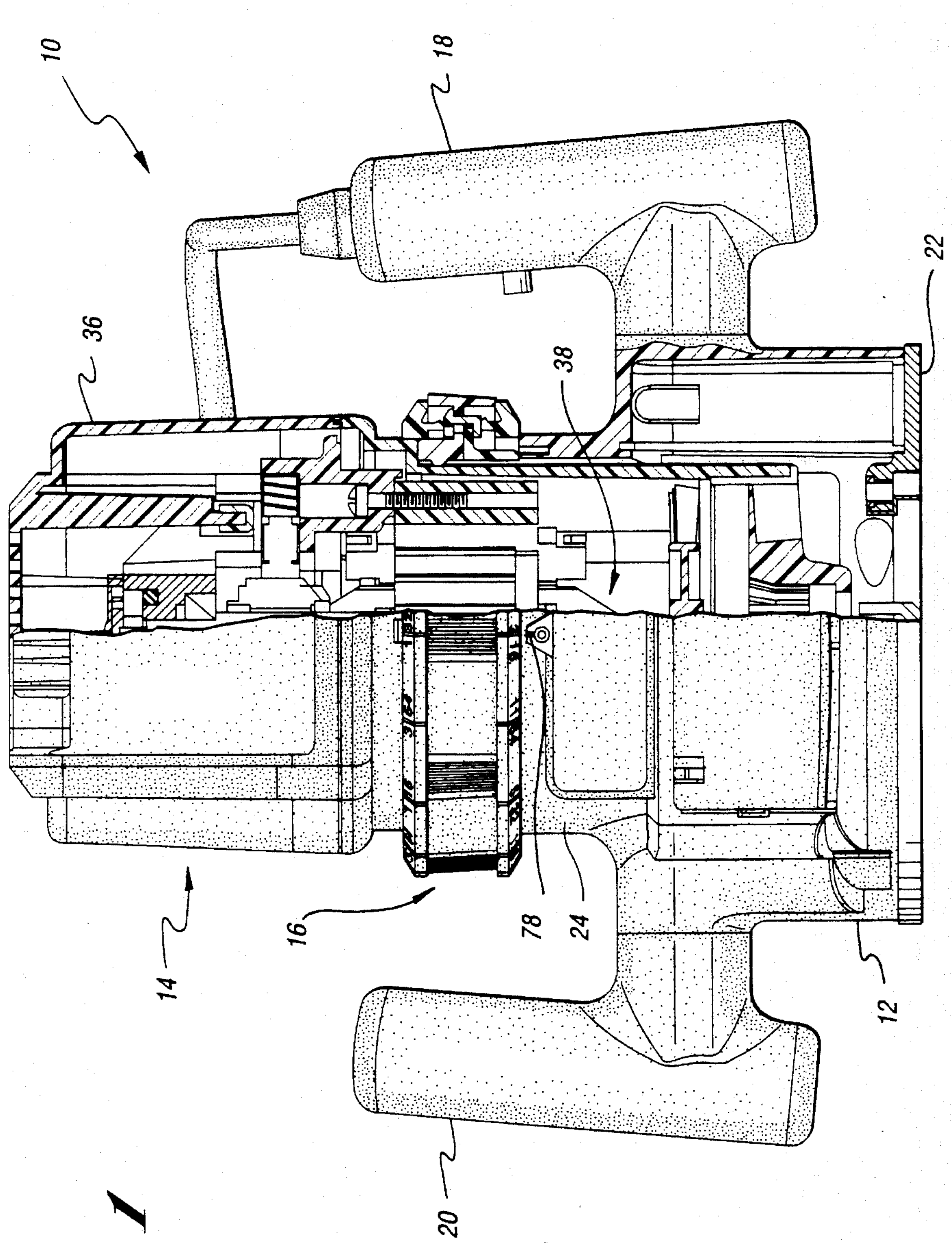
FIG. 1 shows a partially cut-away side elevation view of a router in accordance with the present invention.
Figure 2:
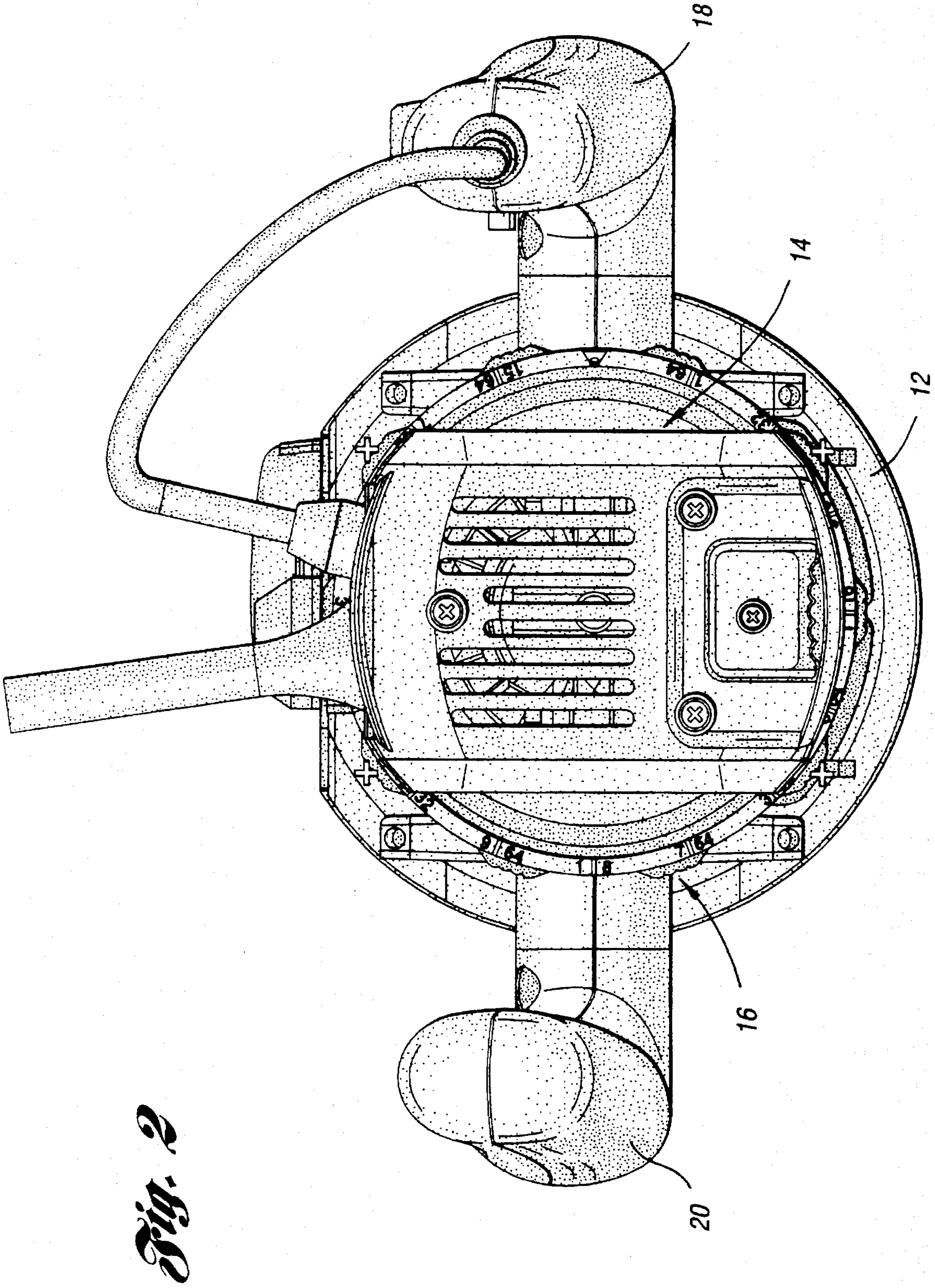
FIG. 2 shows a plan view of the router of FIG. 1.
Figure 3:
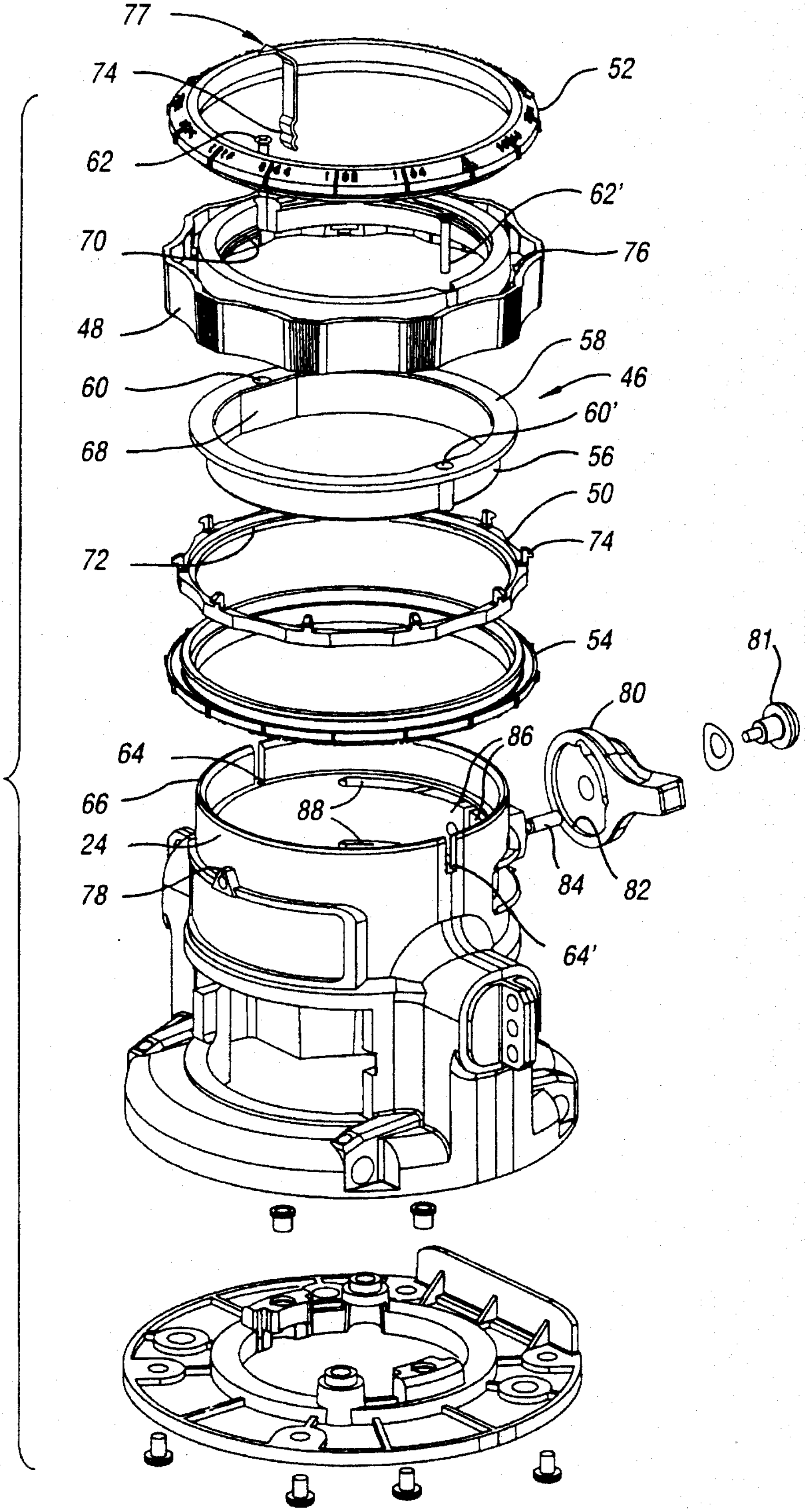
FIG. 3 shows an exploded perspective view of the router of FIG. 1.

A router in accordance with the present invention is shown in FIG. 1, a partially cut-away side elevational view. The router 10 is made up of three main parts; base 12, a motor assembly 14 and a height adjustment ring assembly 16. Base 12 is provided with a pair of handles 18 and 20, a base plate 22 for cooperating with a workpiece, and a tubular region 24 shown in FIG. 3 which is sized to receive a portion of motor assembly 14.

Figure 4:
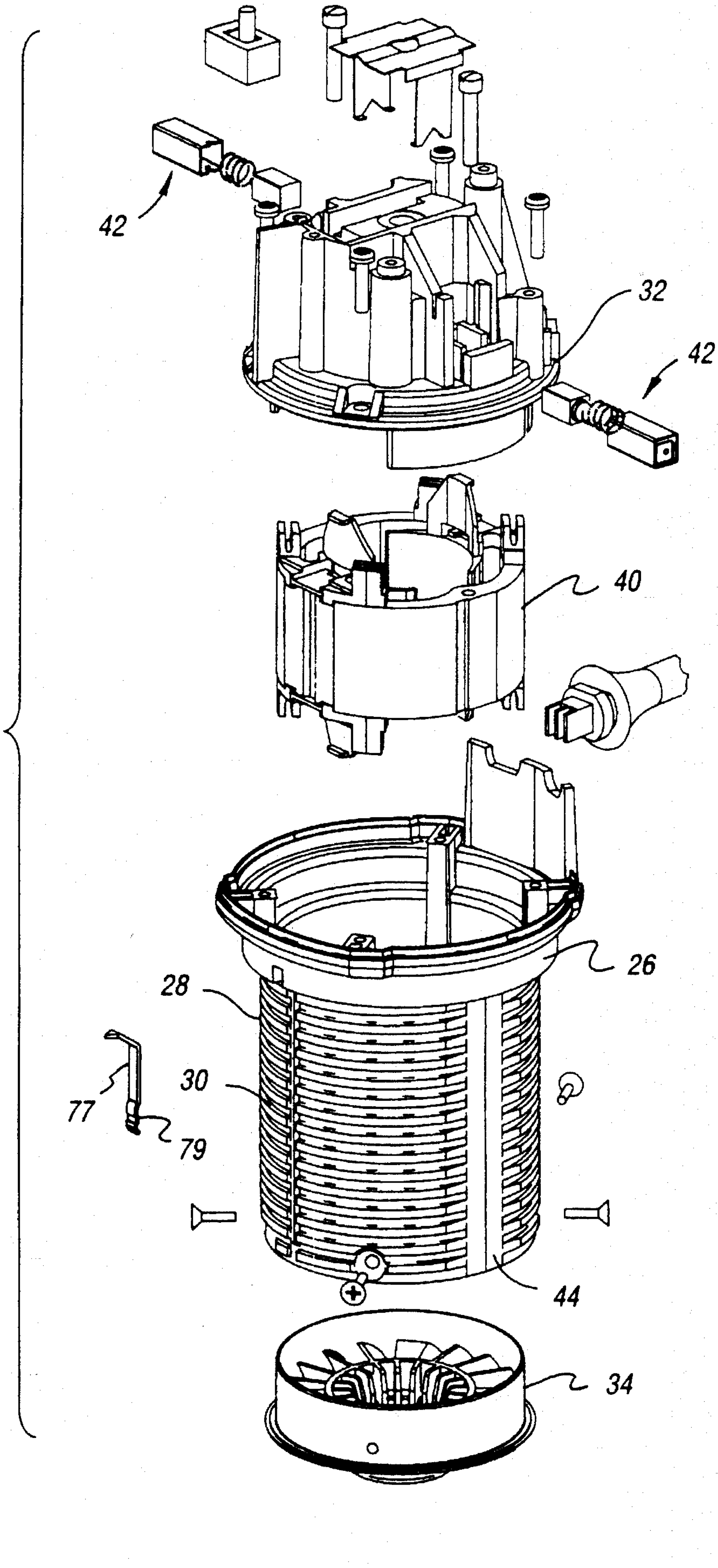
FIG. 4 shows an exploded perspective view of a router motor assembly and stator for use in accordance with the present invention.

With reference to FIGS. 1 and 4, motor assembly 14 is made up of a motor housing 26 formed by motor housing body 28 which is generally cylindrical in shape and provided with external threads 30. Motor housing 26 is also provided with an upper end plate 32, a lower end plate 34 and a cover 36. A motor armature 38, laminate stack 40 and a pair of brush assemblies 42 are affixed to the motor assembly in a conventional manner in order to form a functional electric motor. Motors of a variety of different types can be utilized, the invention is not limited to the specific motor structure illustrated.

Figure 5:
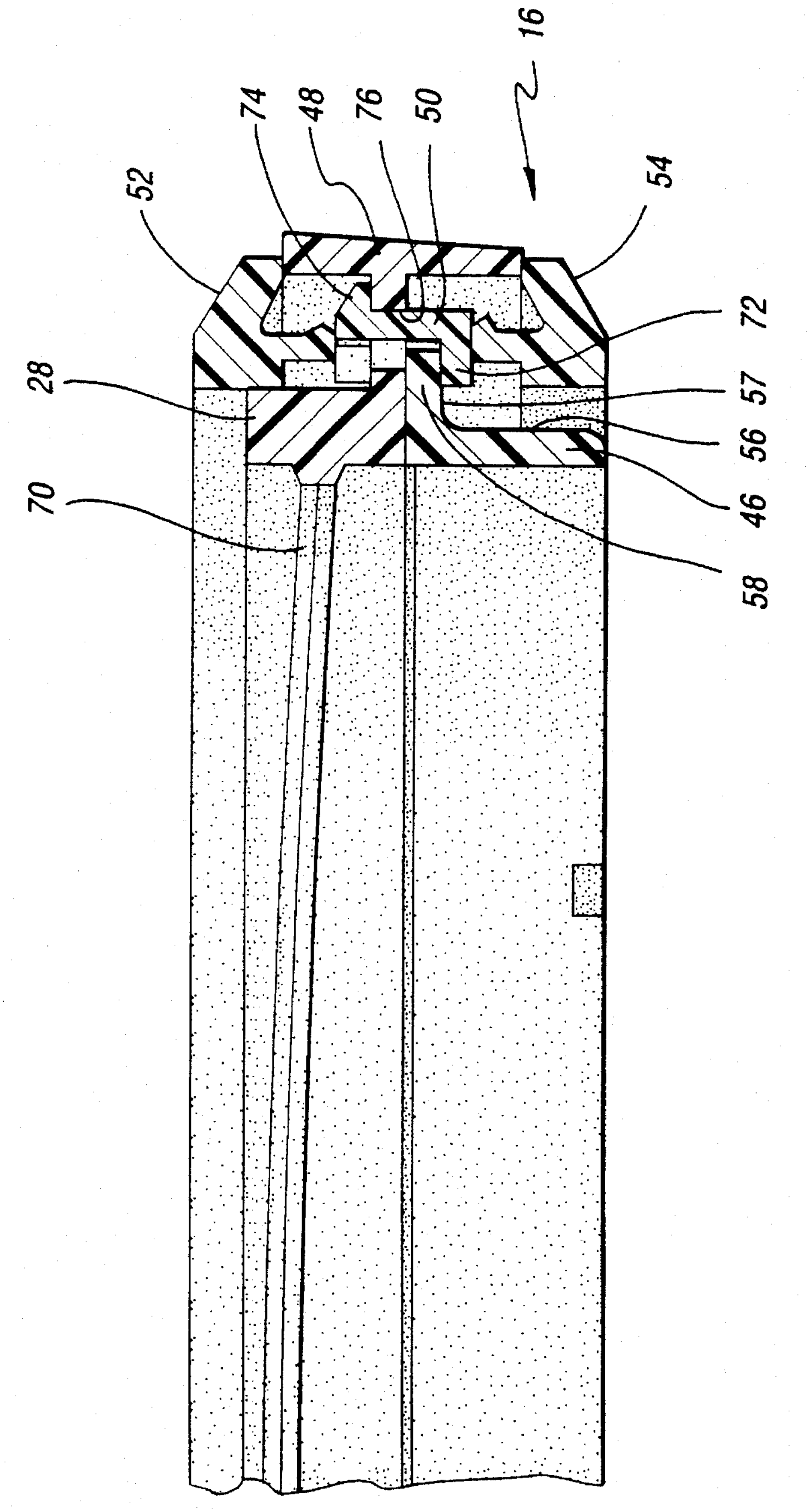
FIG. 5 shows a cut-away vertical cross section of a router adjustment ring assembly in accordance with the present invention.

The height adjustment ring assembly 16 of the present invention positively lifts and lowers the motor assembly 14 relative to the base 12 enabling it to function equally well in both upright and inverted orientations. Height adjustment ring assembly 16 is shown in the exploded view in FIG. 3 (see also FIG. 5, a cut-away sectional view of the ring assembly 16). Height adjustment ring assembly 16 of the preferred embodiment is made up of five annular members; support member 46, height adjustment ring 48, retainer 50 and upper and lower zero reset rings 52 and 54. Support member 46 has a generally inverted L-shape cross-section having a tubular ring section 56 and an annular disk section 58. Disk 58 is provided with an upper surface shown in FIG. 3 and an opposed lower surface which can be seen in FIG. 1. Support member 46 is also provided with a pair of apertures 60 and 60' which are sized to receive screws 62 and 62' which then cooperate with threaded holes 64 and 64' in the base. Support member 46 and base 12, when assembled, act as a unitary piece and are securely locked together. Support member 46 rests upon the top edge 66 of the base tubular region 24 shown in FIG. 3. Support member 46 is additionally provided with a pair of flats 68 which cooperate with flats 44 on the motor housing body 28 to prevent relative rotation of a motor housing 26 relative to base 12.

Height adjustment ring 48 is provided with an internal thread 70 sized to cooperate with external threads 30 on the motor housing body 28. Height adjustment ring 48 engages the upper surface of the flange portion 58 of the support member 46 in a conventional manner to raise the motor assembly when the router is in the upright position. In order to raise the motor while in the inverted position, retainer 50 is provided which cooperates with the lower surface 57 of flange portion 58. Retainer 50 has a generally L-shaped cross-section with an inwardly extending rim 72 which cooperates with the lower surface 57 of flange portion 58. Retainer 50 is securely attached to height adjustment ring 48 by a plurality of circumferentially spaced apart latches 74 which snap into the like number of apertures 76 formed in height adjustment ring 48. Retainer 50 and height adjustment ring 48 once assembled, entrap flange portion 58 of support member 46 therebetween, limiting axial movement while allowing free relative rotation.

Upper zero reset ring 52 simply snaps into height adjustment ring 48 as shown in FIG. 1. When assembled, upper zero reset ring is frictionally engaged with the height adjustment ring and is capable of being rotated by the operator in order to locate the indicia formed on the zero reset ring adjacent the reference pointer 77. The pointer 77 is retained by the notch 79 to a tab on the support member 46. The zero reset ring 52 enables the operator to gauge how much the router cutting tool is being moved as the height adjustment ring 48 rotates. Upper zero reset ring 52 works quite satisfactorily when the router is in the normal upright position. However, when the router is used in inverted position in a router table or the like, the conventional upper zero reset ring is frequently obstructed from view. The present invention is preferably provided with a lower zero reset ring 54 which snaps into a lower portion of height adjustment ring 48 opposite the upper zero reset ring. Lower zero reset ring 54 functions the same way as upper zero reset ring 52 except that the lower zero reset ring 54 is provided with indicia which aligns with reference mark 78 formed on the base tubular region 24.

Once the height of the router bit has been properly positioned, it is desirable to lock the base 12 to the motor assembly 14. This can be done in a number of conventional manners. The router 10 illustrated in FIG. 3 utilizes a lock lever 80 attached to base 12 by shoulder screw 81 having an eccentric inner cam surface 82 which cooperates with dowel pin 84 on fingers 86 integrally formed into base 12. Fingers 86 are defined by a series of slots 88 formed in a base. Rotating lock lever 80 in one direction causes dowel pin 84 to be biased together squeezing the fingers 86 onto the motor housing body 28. Rotating the lock lever 80 in the opposite direction allows fingers 86 to flex outward so as to facilitate adjustment of the motor assembly height relative to the base.

While the best mode for carrying out the invention has been described in detail, those familiar with the art to which this invention relates will recognize various alternative designs and embodiments for practicing the invention within the scope of the appended claims. It will also be understood that the words used are words of description rather than limitation and that various changes may be made without departing from the spirit and scope of the invention disclosed.

What is claim is:

1. A height adjustment ring assembly for adjusting height of a router motor housing relative to a router base, the router being movable between upright and inverted positions, the housing having external threads formed thereon, the height adjustment ring assembly comprising:

a support member secured to the router base, said support member having a radially extending flange portion;

an annular adjustment ring having an internal thread for cooperation with the external threads for height adjustment; and means for entrapping the flange portion with respect to the adjustment ring, thereby limiting relative axial movement while allowing free relative rotation of the adjustment ring with respect to the support member for adjustment of the router motor housing regardless of router position.

2. The height adjustment ring assembly of claim 1, wherein said means for entrapping the flange portion comprises an annular retainer secured to said adjustment ring and having an inwardly extending rim, whereby the flange portion of said support member is entrapped between said rim and said adjustment ring.

3. The height adjustment ring assembly of claim 1, further comprising:

first and second zero reset rings rotatably secured to said adjustment ring for relative rotation with respect to the adjustment ring, each said zero reset ring having indicia formed thereon; and first and second reference markers secured with respect to the router body adjacent the first and second zero reset rings, respectively, thus facilitating accurate adjustment of the motor housing with respect to the router base in both the upright and inverted positions.

4. The height adjustment ring assembly of claim 2, wherein said adjustment ring forms a plurality of apertures therethrough and said annular retainer further comprises a plurality of latches extending therefrom for cooperation with said apertures.

5. The height adjustment ring assembly of claim 2, wherein:

said flange portion includes a lower surface;

said annular retainer comprises a generally L-shaped cross-section; and said inwardly extending rim comprises a first surface which slidably engages said lower surface of said flange portion.

6. The height adjustment ring assembly of claim 2, wherein said adjustment ring comprises:

an inner shell supporting said internal thread and having a lower surface slidably engaging said support member;

a radially extending center portion having a plurality of apertures therethrough for engagement with said retainer, and extending radially outward from said inner shell; and an outer shell portion extending from said center portion and having a plurality of finger indentations formed therearound to facilitate rotation of the adjustment ring.

7. The height adjustment ring assembly of claim 5, wherein the router base has an upper edge which engages said lower surface of said flange portion.

8. A height adjustment ring assembly for adjusting height of a router motor housing relative to a router base of an invertible router, the housing having external threads formed thereon, the height adjustment ring assembly comprising:

a support member secured to the router base, said support member having a radially extending flange portion;

an annular adjustment ring having an internal thread for cooperation with the external threads; and an annular retainer secured to said adjustment ring and having an inwardly extending rim, whereby the flange portion of said support member is entrapped between said rim and said adjustment ring, thus limiting relative axial movement while allowing free relative rotation for adjustment of the router motor housing relative to the router base regardless of router position.

9. The height adjustment ring assembly of claim 8, wherein said adjustment ring forms a plurality of apertures therethrough and said annular retainer further comprises a plurality of latches extending therefrom for cooperation with said apertures.

10. The height adjustment ring assembly of claim 8, wherein:

said flange portion includes a lower surface;

said annular retainer comprises a generally L-shaped cross-section; and said inwardly extending rim comprises a first surface which slidably engages said lower surface of said flange portion.

11. The height adjustment ring assembly of claim 8, wherein said adjustment ring comprises:

an inner shell supporting said internal thread and having a lower surface slidably engaging said support member;

a radially extending center portion having a plurality of apertures therethrough for engagement with said retainer, and extending radially outward from said inner shell; and an outer shell portion extending from said center portion and having a plurality of finger indentations formed therearound to facilitate rotation of the adjustment ring.

12. The height adjustment ring assembly of claim 10, wherein the router base has an upper edge which engages said lower surface of said flange portion.

13. The height adjustment ring assembly of claim 8, wherein said support member is screwed to said router base.

14. The height adjustment ring assembly of claim 8, wherein said support member and the motor housing each comprise a plurality of matable flats for preventing relative rotation.

15. The height adjustment ring assembly of claim 8, further comprising:

first and second zero reset rings rotatably secured to said adjustment ring for relative rotation with respect to the adjustment ring, each said zero reset ring having indicia formed thereon; and first and second reference markers secured with respect to the router base adjacent the first and second zero reset rings, respectively, thus facilitating accurate adjustment of the motor housing with respect to the router base in both the upright and inverted positions.

16. A height adjustment ring assembly for adjusting the height of a router motor housing relative to a router base, the router being movable between upright and inverted positions, the housing having external threads formed thereon, the height adjustment ring assembly comprising:

a support member secured to the router base, said support member having a radially extending flange portion;

an annular adjustment ring having an internal thread for cooperation with the external threads, said adjustment ring forming a plurality of apertures therethrough;

an annular retainer having a plurality of latches extending therefrom for cooperation with said apertures, and having an inwardly extending rim, whereby the flange portion of said support member is entrapped between said rim and said adjustment ring, limiting relative axial movement while allowing free relative rotation of the adjustment ring with respect to the support member for adjustment of the router motor housing regardless of router position;

first and second zero reset rings rotatably secured to said adjustment ring for relative rotation between the adjustment ring and the respective zero reset ring, each said zero reset ring having indicia formed thereon; and first and second reference markers secured with respect to the router base adjacent the first and second zero reset rings, respectively, thus facilitating accurate adjustment of the motor housing with respect to the router base in both the upright and inverted positions.

* * * * *